US012462696B2

(12) United States Patent
Kosyanchuk

(10) Patent No.: US 12,462,696 B2
(45) Date of Patent: Nov. 4, 2025

(54) MULTIPARAMETER WEIGHTED LANDING RUNWAY DETECTION ALGORITHM

(71) Applicant: Rockwell Collins, Inc., Cedar Rapids, IA (US)

(72) Inventor: Egor Kosyanchuk, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 269 days.

(21) Appl. No.: 18/097,428

(22) Filed: Jan. 16, 2023

(65) Prior Publication Data

US 2024/0242616 A1 Jul. 18, 2024

(51) Int. Cl.
G08G 5/00 (2025.01)
B64D 43/02 (2006.01)
B64D 45/04 (2006.01)
G06V 20/10 (2022.01)
G06V 20/17 (2022.01)
G08G 5/20 (2025.01)
G08G 5/54 (2025.01)

(52) U.S. Cl.
CPC ............ *G08G 5/54* (2025.01); *G06V 20/17* (2022.01); *G06V 20/176* (2022.01); *G08G 5/20* (2025.01)

(58) Field of Classification Search
None
See application file for complete search history.

(56) References Cited

U.S. PATENT DOCUMENTS

| | | |
|---|---|---|
| 3,789,356 A | 1/1974 | Harenberg et al. |
| 5,353,022 A | 10/1994 | Middleton et al. |
| 6,304,800 B1 | 10/2001 | Ishihara et al. |
| 7,382,287 B1 | 6/2008 | Chen et al. |
| 7,916,042 B2 | 3/2011 | Constans |
| 8,209,122 B2 | 6/2012 | Nichols et al. |
| 8,346,464 B2 | 1/2013 | Gauffriau et al. |
| 9,008,873 B1 | 4/2015 | Phillips et al. |
| 9,399,524 B2 | 7/2016 | He et al. |
| 9,499,279 B2 | 11/2016 | He et al. |
| 9,527,601 B2 | 12/2016 | Wyatt et al. |
| 9,552,737 B1 | 1/2017 | Theriault et al. |
| 9,731,838 B2 | 8/2017 | Conner et al. |
| 10,214,300 B2 | 2/2019 | Feyereisen et al. |
| 10,514,707 B1 | 12/2019 | Carrico et al. |
| 10,518,897 B2 | 12/2019 | Charbonnier et al. |
| 10,635,256 B2 | 4/2020 | Lepage et al. |
| 10,643,480 B2 | 5/2020 | Sherry et al. |
| 11,004,347 B1 | 5/2021 | Byxbe et al. |
| 11,282,400 B2 | 3/2022 | Byxbe et al. |

(Continued)

*Primary Examiner* — Angela Y Ortiz
*Assistant Examiner* — Michael T Silva
(74) *Attorney, Agent, or Firm* — Suiter Swantz IP

(57) ABSTRACT

A system is described. The system predicts a landing runway for the aircraft. The landing runway is predicted using geometry and parameters which describe the position of the aircraft in space. The parameters include track alignment, vector alignment, vertical alignment, in-approach geometry, and in-flight plan. The parameters are combined to determine runway alignment scores for each runway. The runway alignment scores indicate how well the aircraft is aligned with the runways. The parameters are not equal in their contribution to the decision-making process and need to be weighted. The parameters are normalized, weighted, and summed to determine the runway alignment score.

15 Claims, 13 Drawing Sheets

(56) References Cited

U.S. PATENT DOCUMENTS

| | | | |
|---|---|---|---|
| 11,868,145 B1* | 1/2024 | Lopez | G08G 5/22 |
| 2005/0151681 A1 | 7/2005 | Conner et al. | |
| 2010/0017051 A1 | 1/2010 | Trautenberg | |
| 2014/0297068 A1* | 10/2014 | Revell | G08G 5/21 |
| | | | 701/16 |
| 2014/0343765 A1* | 11/2014 | Suiter | G08G 5/54 |
| | | | 701/18 |
| 2015/0243174 A1* | 8/2015 | Conner | G08G 5/21 |
| | | | 701/120 |
| 2015/0307207 A1* | 10/2015 | Meunier | B62D 43/02 |
| | | | 701/16 |
| 2022/0028281 A1* | 1/2022 | Byxbe | G08G 5/723 |
| 2022/0139239 A1* | 5/2022 | Jee | G08G 5/0021 |
| | | | 701/3 |

* cited by examiner

700

702 RETRIEVE RUNWAY DATABASE FROM MEMORY

704 COMPUTE RUNWAY ALIGNMENT SCORE FOR EACH RUNWAY

706 SELECTED EXPECTED LANDING RUNWAY BASED ON RUNWAY SLIGNMENT SCORES

708 DETERMINE RUNWAY OVERRUN PROBABILITY FOR EXPECTED LANDING RUNWAY

FIG. 7 ures, in accordance with one or more embodiments of the present disclosure.

MULTIPARAMETER WEIGHTED LANDING RUNWAY DETECTION ALGORITHM

TECHNICAL FIELD

The present invention generally relates to automatic landing aids, and more specifically to automatic runway selection.

BACKGROUND

Pilots may deviate from flight plans during landing. For example, pilots may be dispatched by towers to a parallel runway or may make an approach to a first runway and then land on another runway. Runway overrun alerting and awareness systems are unable to detect changes to the landing runway. The runway overrun alerting and awareness systems instead determine the overrun probability for the runway listed in the flight plan. The runway overrun alerting and awareness systems then output the overrun probabilities. The overrun probability are not updated for the actual runway used during landing. Therefore, it would be advantageous to provide a device, system, and method that cures the shortcomings described above.

SUMMARY

A system is described, in accordance with one or more embodiments of the present disclosure. In some embodiments, the system includes a memory maintaining program instructions. In some embodiments, the system includes one or more processors configured to execute the program instructions. In some embodiments, the program instructions cause the one or more processors to determine a plurality of track alignments, a plurality of vector alignment, and a plurality of vertical alignments. In some embodiments, the plurality of track alignments, the plurality of vector alignment, and the plurality of vertical alignments are determined between an aircraft and a plurality of runways. In some embodiments, the plurality of track alignments are an angular difference between a track of the aircraft and a runway bearing for each of the plurality of runways. In some embodiments, the plurality of vector alignments are an angular difference between a vector from the aircraft to the plurality of runways and the runway bearing for each of the plurality of runways. In some embodiments, the plurality of vertical alignments are an angular difference between an expected glideslope and an actual glideslope for each of the plurality of runways. In some embodiments, the program instructions cause the one or more processors to determine a plurality of in-approach geometry parameters. In some embodiments, the plurality of the in-approach geometry parameters indicate whether the aircraft is in an approach zone for each of the plurality of runways. In some embodiments, the program instructions cause the one or more processors to determine a plurality of in-flight plan parameters. In some embodiments, the plurality of in-flight plan parameters indicate whether the plurality of runways are listed as an arrival runway of the aircraft in a flight plan. In some embodiments, the program instructions cause the one or more processors to select an expected landing runway from the plurality of runways based on the plurality of track alignments, the plurality of vector alignments, the plurality of vertical alignments, the plurality of in-approach geometry parameters, and the plurality of in-flight plan parameters

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 7 depicts a flow diagram of a method, in accordance with one or more embodiments of the present disclosure.

DETAILED DESCRIPTION OF THE INVENTION

Figure 1:
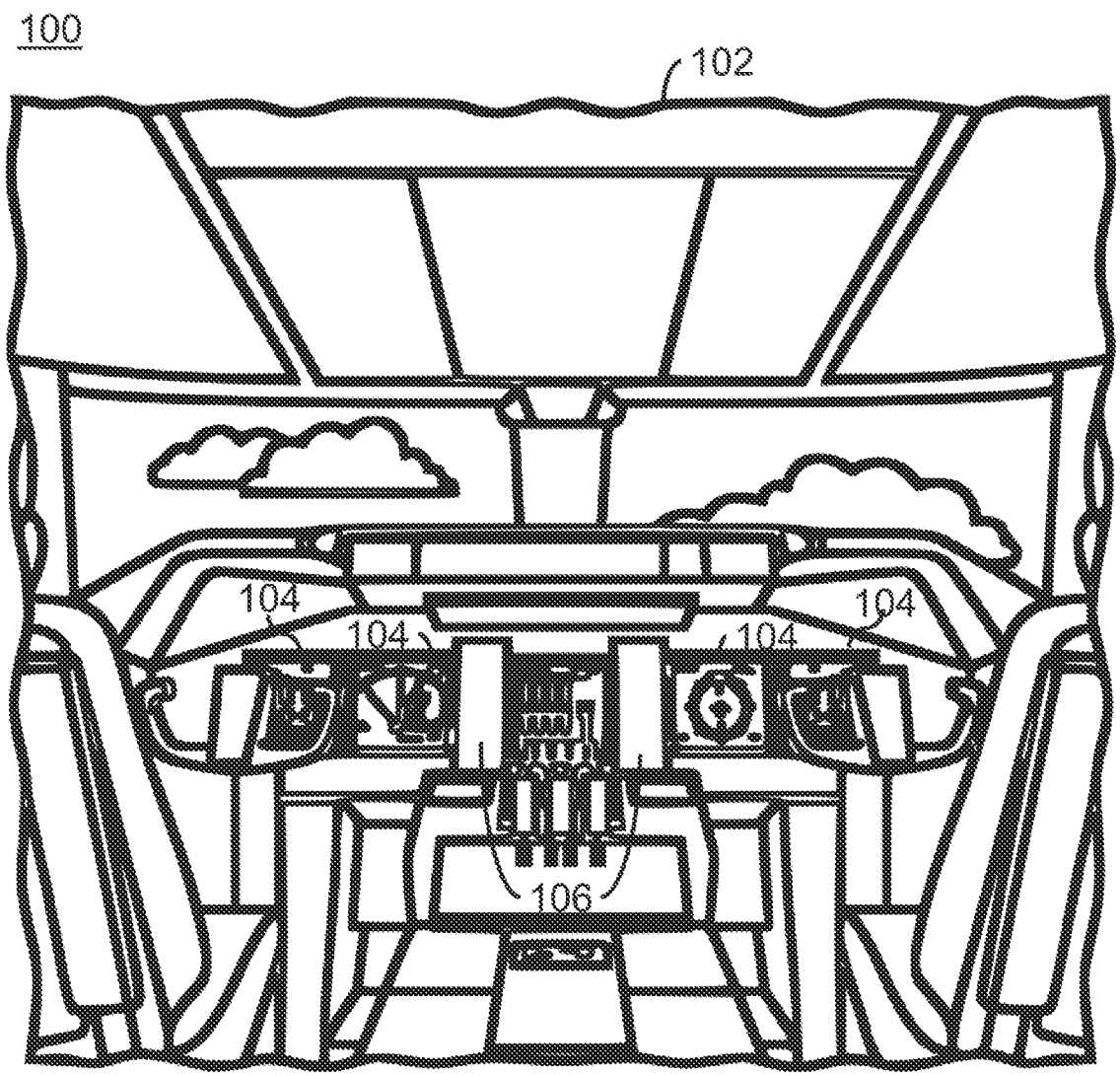
FIG. 1 depicts a schematic illustration of an aircraft control center or cockpit, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. Embodiments of the present disclosure are directed to a multi-parameter weighting algorithm. The multi-parameter weighting algorithm dynamically evaluates a runway alignment score for each runway at an airport. The runway alignment score indicates how well the aircraft is aligned to the runway. The best runway alignment score corresponds to the most likely landing runway for the aircraft. A runway overrun system then determines a probability of the aircraft overrunning the landing runway.

U.S. Ser. No. 11/282,400B2, titled "Runway overrun awareness alerting system with discrete indicator", filed on Jul. 27, 2020; U.S. Publication Number US2022/0028281A1, titled "Runway Overrun Awareness Alerting System with Trending Indicator", filed on Jul. 27, 2020; U.S. Pat. No. 9,552,737B1, titled "Landing distance indicator generating system, device, and method", filed on May 29, 2015; and U.S. Ser. No. 10/514,707B1, titled "Flight phase stability indicator system and method", filed on Jun. 26, 2014; are each incorporated herein by reference in the entirety.

Referring to FIG. 1, a schematic illustration of an aircraft control center or cockpit 102 is shown according to an exemplary embodiment of the inventive concepts disclosed herein. The cockpit 102 may include one or more flight displays 104 and one or more user interface ("UI") elements 106. The flight displays 104 may be implemented using any of a variety of display technologies, including CRT, LCD, organic LED, dot matrix display, and others. The flight displays 104 may be navigation (NAV) displays, primary flight displays, electronic flight bag displays, tablets, synthetic vision system displays, head up displays (HUDs) with or without a projector, and the like. The flight displays 104 may be used to provide information to the flight crew, thereby increasing visual range and enhancing decision-making abilities. One or more of the flight displays 104 may be configured to function as, for example, a primary flight display (PFD) used to display altitude, airspeed, vertical speed, and navigation and traffic collision avoidance system (TCAS) advisories. One or more of the flight displays 104 may also be configured to function as, for example, a multi-function display used to display navigation maps, weather radar, electronic charts, TCAS traffic, aircraft maintenance data and electronic checklists, manuals, and procedures. One or more of the flight displays 104 may also be configured to function as, for example, an engine indicating and crew-alerting system (EICAS) display used to display critical engine and system status data. Other types and functions of the flight displays 104 are contemplated as well. According to various exemplary embodiments of the inventive concepts disclosed herein, at least one of the flight displays 104 may be configured to provide a rendered display from the systems and methods of the present disclosure.

In some embodiments, the flight displays 104 may provide an output based on data received from a system external to an aircraft, such as a ground-based weather radar system, satellite-based system, or from a system of another aircraft. In some embodiments, the flight displays 104 may provide an output from an onboard aircraft-based radar system, LIDAR system, infrared system or other system on an aircraft. For example, the flight displays 104 may include a weather display, a weather radar map, and a terrain display. In some embodiments, the flight displays 104 may provide an output based on a combination of data received from multiple external systems or from at least one external system and an onboard aircraft-based system. The flight displays 104 may include an electronic display or a synthetic vision system (SVS). For example, the flight displays 104 may include a display configured to display a two-dimensional (2-D) image, a three-dimensional (3-D) perspective image of terrain and/or weather information, or a four-dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 106 may include, for example, dials, switches, buttons, touch screens, keyboards, a mouse, joysticks, cursor control devices (CCDs) or other multi-function key pads certified for use with avionics systems. The UI elements 106 may be configured to, for example, allow an aircraft crew member to interact with various avionics applications and perform functions such as data entry, manipulation of navigation maps, and moving among and selecting checklist items. For example, the UI elements 106 may be used to adjust features of the flight displays 104, such as contrast, brightness, width, and length. The UI elements 106 may also (or alternatively) be used by an aircraft crew member to interface with or manipulate the displays of the flight displays 104. For example, the UI elements 106 may be used by aircraft crew member to adjust the brightness, contrast, and information displayed on the flight displays 104. The UI elements 106 may additionally be used to acknowledge or dismiss an indicator provided by the flight displays 104. The UI elements 106 may be used to correct errors on the flight displays 104. Other UI elements 106, such as indicator lights, displays, display elements, and audio alerting devices, may be configured to warn of potentially threatening conditions such as severe weather, terrain, and obstacles, such as potential collisions with other aircraft.

Figure 2:
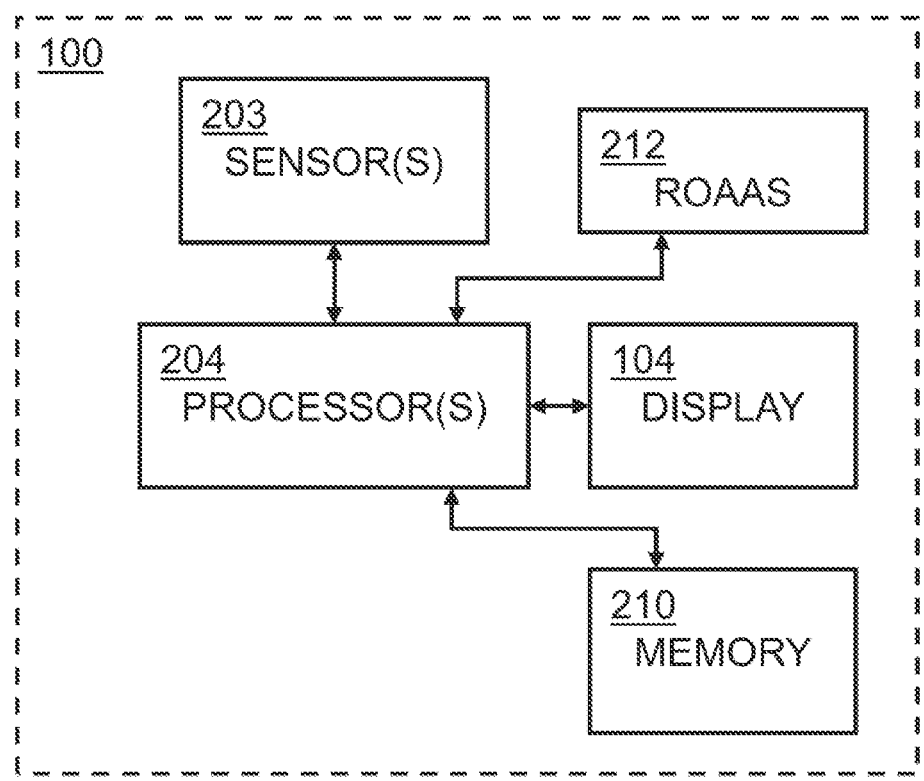
FIG. 2 depicts a block diagram of a system, in accordance with one or more embodiments of the present disclosure.

Referring now to FIG. 2, a block diagram of a system 200 is described, in accordance with one or more embodiments of the present disclosure. The system 200 includes the aircraft 100. The aircraft 100 may be in communication with one or more exterior systems (not depicted). As depicted, the aircraft 100 may include the flight displays 104, aircraft sensors 203, processors 204, memory 210, and the like.

The aircraft sensors 203 may include, for example, one or more airspeed sensors, location tracking sensors (e.g., GPS), lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, fuel sensors, or any other aircraft sensors or sensing systems that may be used to monitor the performance of an aircraft or weather local to or remote from the aircraft. Data from the aircraft sensors 203 may be output to the processors 204 for further processing and display, for input to a radar system, or for transmission to a station (e.g., a ground-based radar system or terrestrial station, air traffic control services system, or other terrestrial station), satellite, or to other aircraft. Data collected from external systems may also be processed by the processors 204 to configure the collected data for display.

In embodiments, the aircraft sensors 203 may generate traffic data (e.g., traffic data 304). The traffic data may be generated in any suitable format, such as, but not limited to, global navigation satellite system (GNSS) data (e.g., global positioning system (GPS)), data related to aircraft position, data related to flight path, flight path management data, registration data, and the like. Much of the present disclosure describes the traffic data in the context of the GNSS data, although this is not intended to be limiting. The GNSS data may be used by the aircraft 100 for various purposes. The GNSS data may also be provided to the processors 204 for further processing and analysis, for storage in memory 210, for use in automated functions, or for transmission to an external system.

In embodiments, the aircraft 100 may include a runway overrun alert and awareness system 212 (ROAAS). The runway overrun alert and awareness system 212 may determine a landing distance. The landing distance may be a predicted landing distance for the aircraft 100 on a landing or arrival runway. The runway overrun alert and awareness system 212 may determine the landing distance using information regarding the landing runway and the aircraft. The runway overrun alert and awareness system 212 must know the landing runway before predicting the landing distance. The crew may enter the landing runway into a flight plan. Even though the crew enters the arrival runway during the flight planning there may be last-minute changes that require the aircraft to maneuver to a different runway at the airport. In this regard, the runway overrun alert and awareness system 212 may be unaware of changes to the landing runway until the crew updates the landing runway.

In embodiments, the aircraft 100 may dynamically update the landing runway provided to the runway overrun alert and awareness system 212. Dynamically updating the landing runway may refer to determining an expected runway in-flight. The processors 204 may determine the expected landing runway by applying a weighting algorithm to one or more parameters, as will be described further herein. The processors 204 may then provide the expected landing runway to the runway overrun alert and awareness system 212. The runway overrun alert and awareness system 212 may determine the landing distance for the expected landing runway. In this regard, the runway overrun alert and awareness system 212 may react to maneuvers and re-establish the actual landing runway used for the landing distance computation with a high degree of certainty. The selection of the expected landing runway by the processors 204 may increase the availability of runway overrun alerting. Advantageously, the runway overrun alert and awareness system 212 may determine the landing distance for the expected landing runway without requiring the crew to update the landing runway in a flight plan. The processors 204 may decrease the crew workload by selecting the expected landing runway automatically.

Figure 3A:
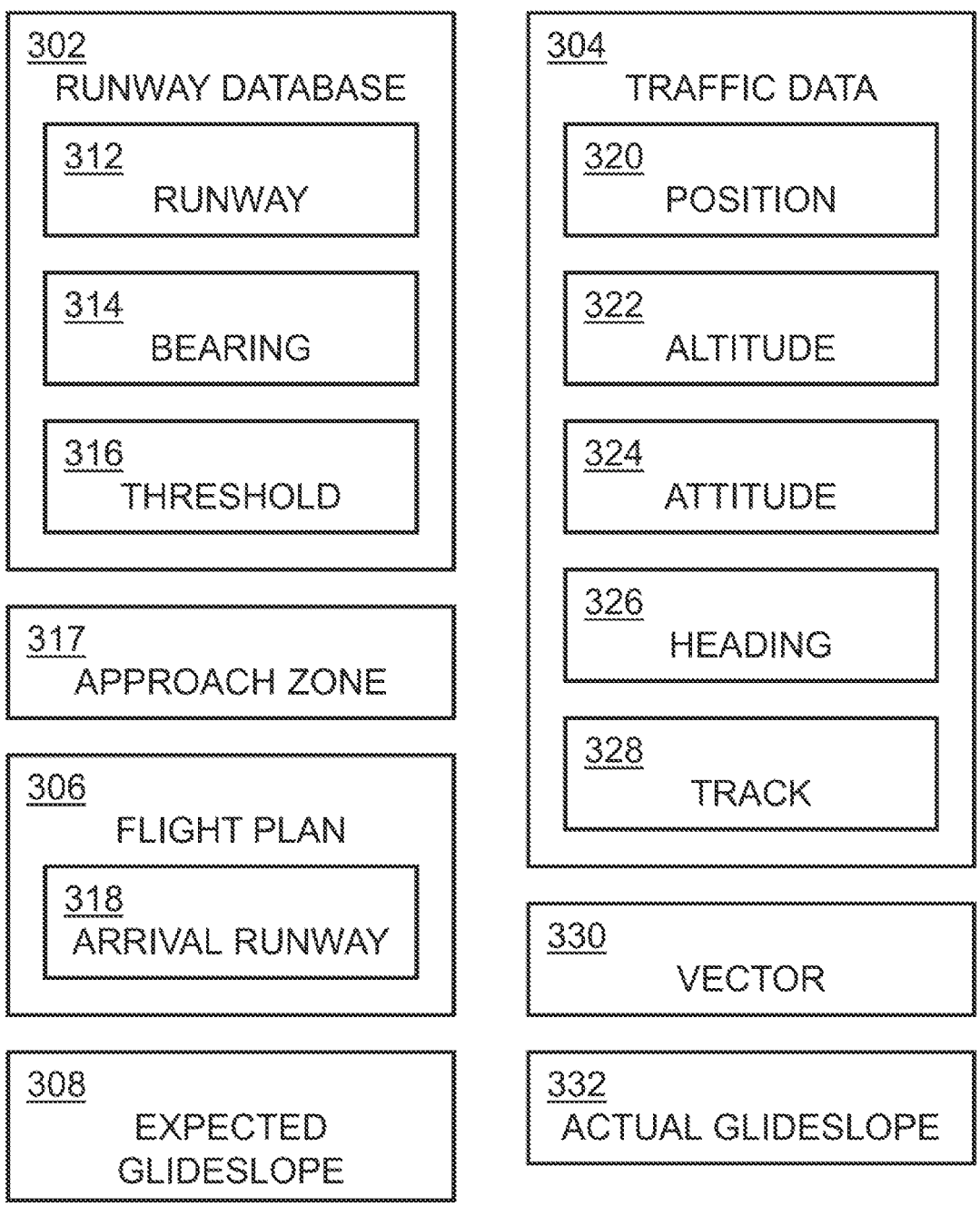
FIGS. 3A-3B depicts a block diagram of a memory, in accordance with one or more embodiments of the present disclosure.
Figure 3B:
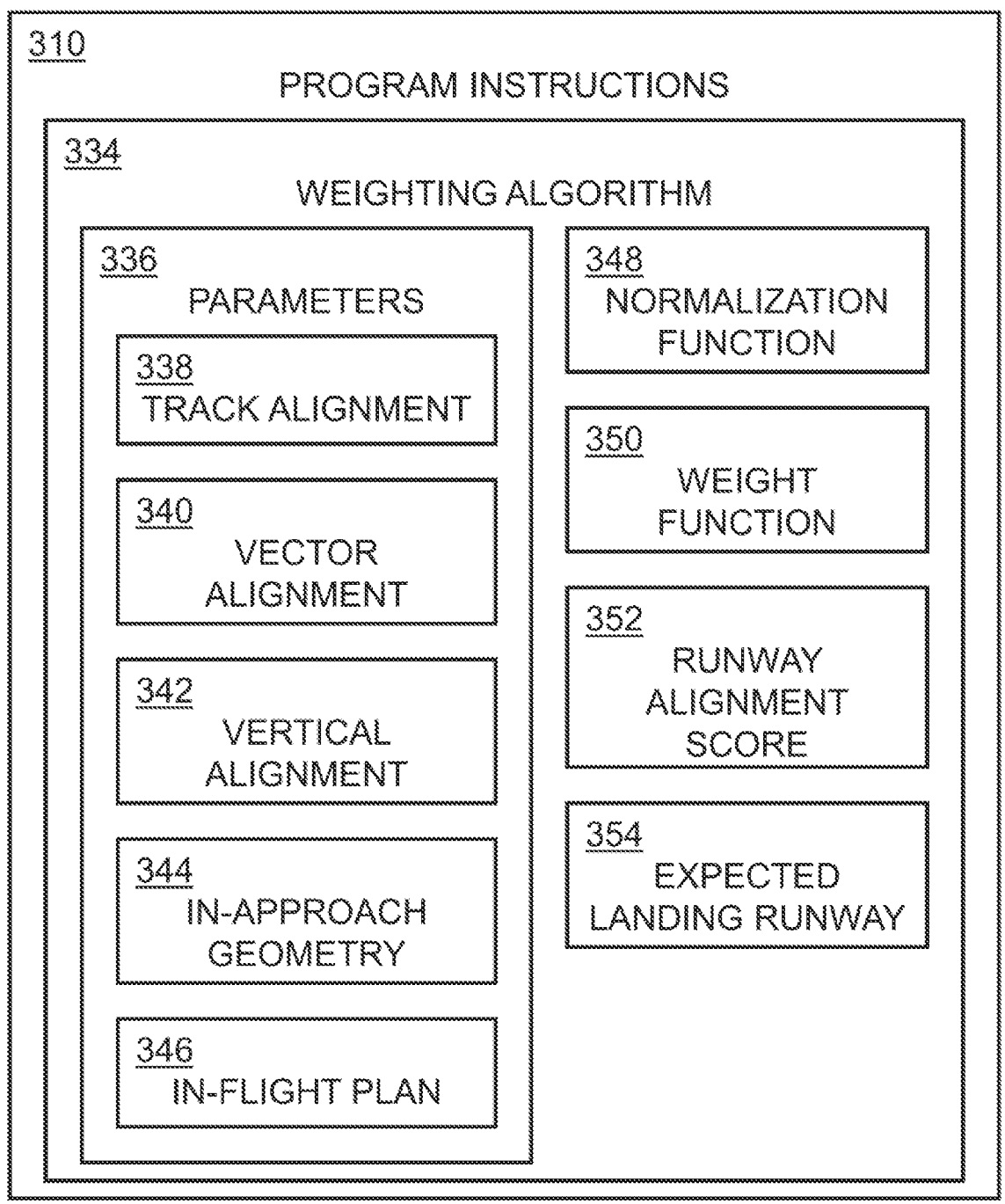

Referring now to FIGS. 3A-3B, the memory 210 is described, in accordance with one or more embodiments of the present disclosure. The memory 210 may include a runway database 302, traffic data 304, flight plan 306, expected glideslope 308, program instructions 310, and the like.

In embodiments, the memory 210 may include the runway database 302. The runway database 302 may also be referred to as an airport database. The runway database 302 may be data-loaded onto the aircraft by maintenance personnel. The runway database 302 may be formatted according to one or more standards. For example, the runway database 302 may be formatted according to ARINC 424, although this is not intended to be limiting. In embodiments, the runway database 302 may include one or more of a runway 312, a bearing 314, a threshold 316, and the like.

The runway 312 may be associated with a runway at an airport. The runway 312 may include an identifier. The identifier for the runway 312 may be based on the bearing 314. The identifier for the runway 312 may also be based on the location of the runway 312 relative to adjacent runways.

The bearing 314 may refer to a compass bearing assigned to each runway 312. The bearing 314 may be at 90 representing east, 180 representing south, 270 representing west, and 360 representing north. In some instances, the bearing 314 may be shortened to two digits and rounded (e.g., 9 representing east, 18 representing south, 27 representing west, and 36 representing north). In this instance, the bearing 314 may range from 1 to 36, although this is not intended to be limiting.

The threshold 316 may refer to a beginning of the runway 312. The position of the threshold 316 may be referred to as a runway threshold position. The runway threshold position may be stored as a coordinate (e.g., latitude and longitude).

The bearing 314 and/or the threshold 316 may be printed on the runway 312. The bearing 314 and/or the threshold 316 may be physically printed on the runway 312 to visually assist the pilot during landing. For example, the bearing 314 may be printed as a set of block letters. By way of another example, the threshold 316 may be printed as threshold marking (e.g., a set of longitudinal stripes with a gap to indicate a centerline).

In embodiments, the memory 210 may include an approach zone 317. The approach zone 317 may refer to a geometric shape. The approach zone may start from the threshold 316 of the runway 312. The approach zone 317 may be centered on the centerline of the runway 312. The approach zone 317 may extend from the threshold 316 for a given distance. In embodiments, the approach zone 317 may include a trapezoidal zone or a triangular zone, although this not intended to be limiting. The size of the approach zone 317 may be determined by analysis and simulation. For example, the approach zone 317 may be computed by the processors 204 from the information in the runway database 302 (e.g., runway 312, bearing 314, threshold 316, and the like).

In embodiments, the memory 210 may include the traffic data 304. The traffic data 304 may include one or more of position 320, altitude 322, attitude 324, heading 326, track 328, and the like. The position 320 may be a global navigation satellite system (GNSS) position. For example, the position 320 may include a global positioning system (GPS) position. For example, the aircraft 100 may include a GPS receiver which determines the position 320. The altitude 322 may be distance of the aircraft 100 above ground. The attitude 324 may be an orientation of the aircraft 100 relative to ground. The heading 326 may be a compass direction of the aircraft 100. The track 328 may refer to an actual path of the aircraft 100 over the ground. The track 328 may also be referred to as aircraft track and/or ground track.

In embodiments, the memory 210 may include the flight plan 306. The flight plan 306 may include various data, such as, but not limited to, an arrival runway 318. The arrival runway 318 may be entered into the flight plan 306. During a landing maneuver, the arrival runway 318 may differ from the expected and/or actual landing runway of the aircraft 100. The arrival runway 318 in the flight plan 306 may be updated in response to receiving a user input. For example, the crew of the aircraft 100 may change the arrival runway 318.

In embodiments, the memory 210 may include an expected glideslope 308. The expected glideslope 308 may refer to a glideslope which the aircraft 100 expects when landing. Glideslope may also be referred to as an approach angle of the aircraft 100. Glideslope may refer to an angle of the aircraft relative to ground on a glidepath to the runway 312. The expected glideslope 308 may include an angle, such as, but not limited to three degrees.

In embodiments, the memory 210 may include vector 330. The vector 330 may refer to a vector from the aircraft 100 to the threshold 316. In this regard, the aircraft 100 may include the vector 330 for each of the runways 312. The vector 330 may be computed based on the position 320 and the threshold 316. For example, the position 320 and the threshold 316 may each include a latitude and longitude point (Lat/Lon points). The vector 330 may be computed between the Lat/Lon points. The vector 330 may be determined by the processors 204, although this is not intended to be limiting.

In embodiments, the memory 210 may include the actual glideslope 332. The actual glideslope 332 may be determined by receiving one or more signals transmitted from a glide slope transmitter, although this is not intended to be limiting. The actual glideslope 332 may also be computed from ground speed and vertical speed components of the aircraft. The aircraft 100 may include the actual glideslope 332 for each of the runways 312. The actual glideslope 332 may vary between each of the runways 312. In particular, the values of the actual glideslope 332 for the aircraft 100 to each of the runways 312 may vary significantly as the aircraft 100 approaches the airport.

In embodiments, the memory 210 may include program instructions 310. The program instructions 310 may be executable by the processors 204. The program instructions 310 may include a weighting algorithm 334. The weighting algorithm 334 may cause the processors 204 to select an expected landing runway 354 from the runways 312. The expected landing runway 354 may be provided to the runway overrun alert and awareness system 212 for determining the runway overrun for the expected landing runway 354. The runway overrun alert and awareness system 212 may determine the runway overrun in response to the processors 204 selecting the expected landing runway 354 from the plurality of runways 312. The processors 204 may also cause the flight display 104 to display the overrun probability in response to determining the overrun probability.

The weighting algorithm 334 may be a multi-parameter weighting algorithm. The multi-parameter weighting algorithm may include one or more parameters 336. The parameters 336 may include, but are not limited to, a track alignment 338, a vector alignment 340, a vertical alignment 342, an in-approach geometry 344, an in-flight plan 346, and the like. In embodiments, the weighting algorithm 334 may select the expected landing runway 354 from the runways 312 based on the track alignments 338, the vector alignments 340, the vertical alignments 342, the in-approach geometry 344 parameters, and the in-flight plan 346 parameters for each of the runways 312. In this regard, the weighting algorithm 334 may consider at least five factors when determining the expected landing runway 354.

Figure 4A:
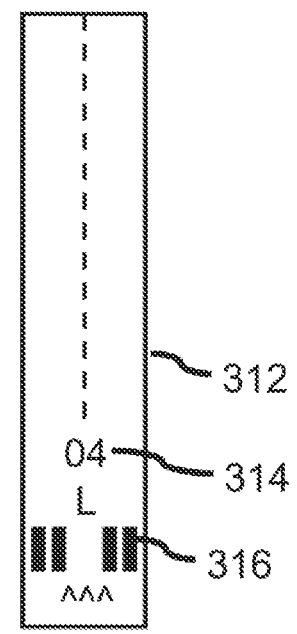
FIG. 4A depicts a top view of an aircraft including a track alignment, in accordance with one or more embodiments of the present disclosure.
Figure 4A:
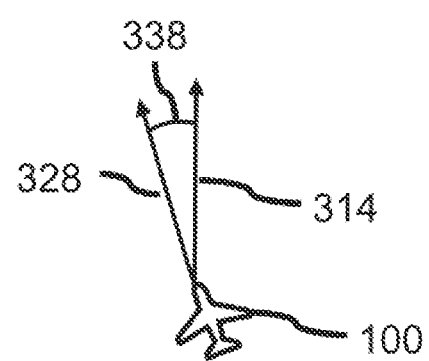

The track alignment 338 parameters may refer to the angular difference between the track 328 of the aircraft 100 and the bearing 314 of the runway 312. The track alignment 338 may be further understood with reference to FIG. 4A. In the example depicted in FIG. 4A, the aircraft 100 includes track 328 which is not aligned to the bearing 314. The track alignment 338 then includes an angular value indicating the angular difference between the track 328 and the bearing 314. As depicted, the track 328 of the aircraft 100 is aligned with the heading 326, although this is not intended to be a limitation of the present disclosure. A track alignment of zero may indicate the track 328 of the aircraft 100 is on a parallel course with the runway bearing. The parallel course may or may not be coincident to the runway bearing, depending on the vector alignment 340. For example, a track alignment of zero and a vector alignment of non-zero may indicate the aircraft is on the parallel course but is not coincident to the runway bearing.

Figure 4B:
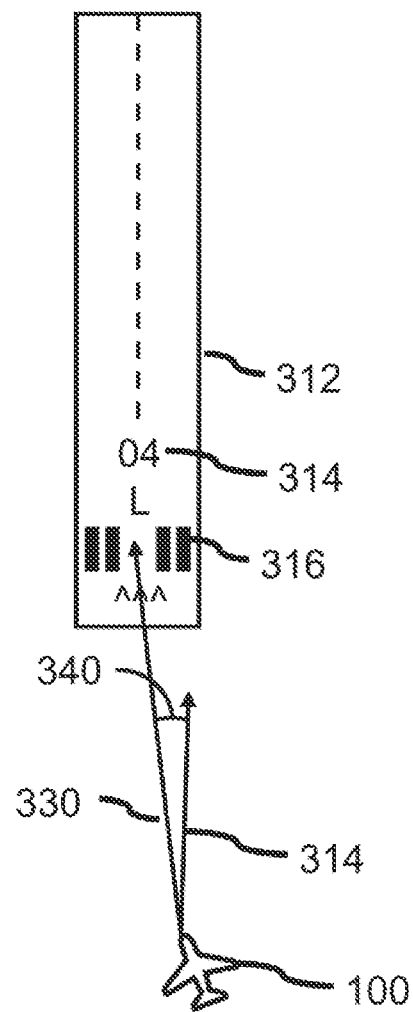
FIG. 4B depicts a top view of an aircraft including a vector alignment, in accordance with one or more embodiments of the present disclosure.

The vector alignment 340 parameters may refer to the angular difference between the vector 330 of the aircraft 100 to the threshold 316 of the runway and the bearing 314 of the runway 312. The vector alignment 340 may be further understood with reference to FIG. 4B. In the example depicted in FIG. 4B, the aircraft 100 includes vector 330 which is directed to the threshold 316. The vector 330 is not aligned to the bearing 314. The vector alignment 340 then includes an angular value indicating the angular difference between the vector 330 and the bearing 314. A vector alignment of zero may indicate the vector 330 of the aircraft 100 is perfectly aligned to the bearing 314. One example of a landing is now described. The aircraft 100 may include a vector alignment 340 of zero and a track alignment 338 of zero or greater. For example, the position of the aircraft may be aligned to the runway such that the vector alignment 340 is zero. However, the aircraft may or may not be on track to the runway. For instance, the runway and/or aircraft may experience cross-winds. The aircraft may be skewed or crabbed relative to the runway to counteract the cross-winds, such that the track alignment 338 is non-zero.

Figure 4C:
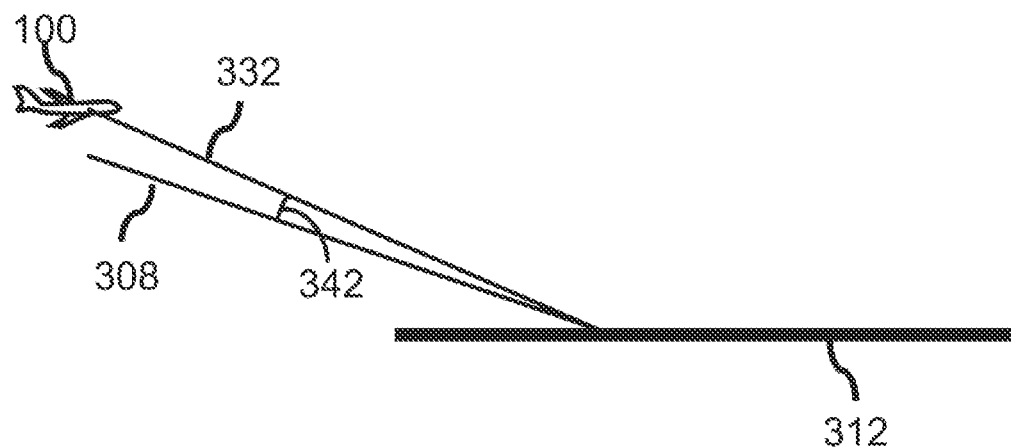
FIG. 4C depicts a side view of an aircraft including a vertical alignment, in accordance with one or more embodiments of the present disclosure.

The vertical alignment 342 parameters may refer to an angular difference between the expected glideslope 308 and the actual glideslope 332. The vertical alignment 342 may be further understood with reference to FIG. 4C. In the example depicted in FIG. 4C, the aircraft 100 includes expected glideslope 308 of three degrees to the runway 312. The aircraft 100 also includes the actual glideslope 332 to the runway 312. The actual glideslope 332 is not aligned to the expected glideslope 308. The vertical alignment 342 then includes an angular value indicating the angular difference between the expected glideslope 308 and the actual glideslope 332.

Figure 4D:
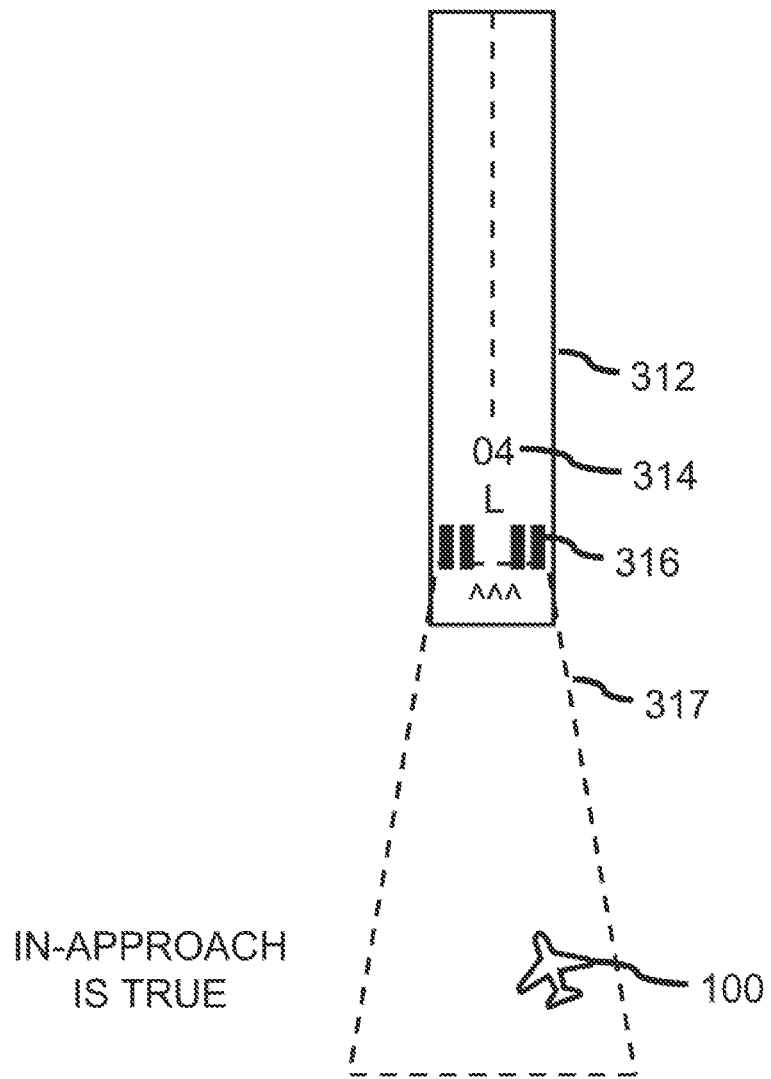
FIG. 4D depicts a top view of an aircraft in an approach zone, in accordance with one or more embodiments of the present disclosure.

The in-approach geometry 344 parameters may indicate whether the aircraft 100 is in the approach zone 317 for each of the runways 312. The in-approach geometry 344 may be determined based on the position 320 of the aircraft 100 and the position of the approach zone 317. In embodiments, the processors 204 may determine whether the aircraft 100 is in the approach zone 317 using a point-in-polygon algorithm, although this is not intended to be limiting. In embodiments, the in-approach geometry 344 may be a Boolean, having one of two possible values. The in-approach geometry 344 may include a true or false for each of the runways 312. The in-approach geometry 344 may be further understood with reference to FIG. 4D. In the example depicted in FIG. 4D, the runway 312 includes the approach zone 317 extending from the threshold 316. The approach zone 317 is depicted as a trapezoid. The aircraft 100 is positioned within the approach zone 317. In this example, the in-approach geometry 344 would be considered to be true. The in-approach geometry 344 may be false where the aircraft 100 is not positioned within the approach zone 317.

The in-flight plan 346 parameters may indicate whether any of the runways 312 are listed as the arrival runway 318 of the aircraft 100 in the flight plan 306. The in-flight plan 346 may be determined by comparing the runways 312 with the arrival runway 318. In embodiments, the in-flight plan 346 may be a Boolean, having one of two possible values. The in-flight plan 346 may include a true or false for each of the runways 312.

The parameters 336 may include units which include deviation ranges. The deviation ranges for each of the parameters may vary and may not be normalized. The track alignment 338, the vector alignment 340, and the vertical alignment 342 may include an angle in degrees. For example, the track alignment 338 and the vector alignment 340 may include an angle between 0° and 180°. By way of another example, the vertical alignment 342 may include an angle between 0° and 90°. The in-approach geometry 344 and the in-flight plan 346 may include a Boolean value of true or false.

In embodiments, the weighting algorithm 334 may include a normalization function 348. The normalization function 348 may be applied to the parameters 336 to generate normalized parameters. For example, the normalized parameters may include a range between 0 and 1, although this is not intended to be limiting. The normalized parameters may include normalized track alignments, normalized vector alignments, normalized vertical alignment, normalized in-approach geometry parameters, and/or normalized in-flight plan parameters. For example, the normalization function 348 may divide the track alignment 338 and the vector alignment 340 by 180° to determine the normalized track alignments and the normalized vector alignments. By way of another example, the normalization function 348 may divide the vertical alignment 342 by 90° to determine the normalized vertical alignment. By way of another example, the normalization function 348 may convert the Boolean values of true or false for the in-approach geometry 344 and the in-flight plan 346 to zero or one to determine the normalized in-approach geometry parameters and normalized in-flight plan parameters.

In embodiments, the weighting algorithm 334 may include a weight function 350. The weighting algorithm 334 may apply the weight function 350 to the normalized parameters to determine weighted parameters. The weight function 350 may include weights for each of the normalized track alignments, normalized vector alignments, normalized vertical alignments, normalized in-approach geometries, and the normalized in-flight plans. The weights for the weight function 350 may be determined empirically based on running multiple landing simulations. In embodiments, the weight function 350 or the weighting for each of the normalized parameters may be determined from a supervised regression model, although this is not intended to be limiting.

In embodiments, the weight function 350 may include a non-linear scale (e.g., a sigmoid, a paraboloid, etc.) for the normalized track alignment, the normalized vector alignment, and/or the normalized vertical alignment. In embodiments, the weight function 350 may include a scalar value for the normalized in-approach geometry and/or the normalized in-flight plan. The non-linear scale and/or the scalar may be adjusted to increase or decrease sensitivity of the weighting algorithm 334 in generating the runway alignment score 352.

Figure 5A:
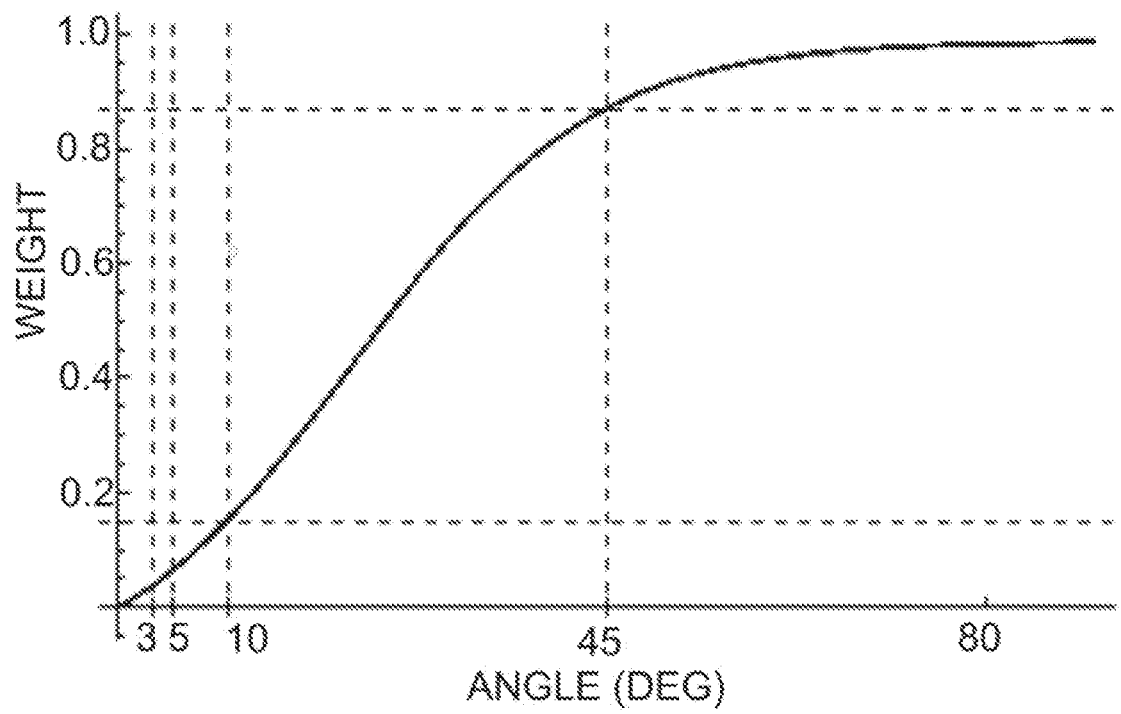
FIG. 5A depicts a sigmoid function, in accordance with one or more embodiments of the present disclosure.

In embodiments, the non-linear scale may include a sigmoid function. The sigmoid function may be applied to the normalized track alignment and/or the normalized vector alignment. The sigmoid function may include a characteristic S-shaped curve including two inflection points. For example, FIG. 5A depicts a sigmoid function 502, although this is not intended to be limiting. The sigmoid function 502 includes a weight of less than 0.05 for the track alignment 338 and/or the vector alignment 340 with an angle of 3 degrees. The sigmoid function 502 includes a weight of less than 0.1 for the track alignment 338 and/or the vector alignment 340 with an angle of 5 degrees. The sigmoid function 502 includes a weight of 0.15 for the track alignment 338 and/or the vector alignment 340 with an angle of 10 degrees. The sigmoid function 502 includes a weight of between 0.85 and 0.9 for the track alignment 338 and/or the vector alignment 340 with an angle of 45 degrees.

The sigmoid function may be selected to reduce the impact of the track alignment 338 and the vector alignment 340 when the aircraft 100 is far from the airport. Instead, the runway alignment score 352 may be controlled by the In-flight plan 346. The track alignment 338 and the vector alignment 340 may provide more weight when the aircraft 100 gets closer to the airport. The sigmoid may increase the impact of the track alignment 338 and the vector alignment 340 over the in-flight plan 346 as the aircraft 100 approaches the airport.

Figure 5B:
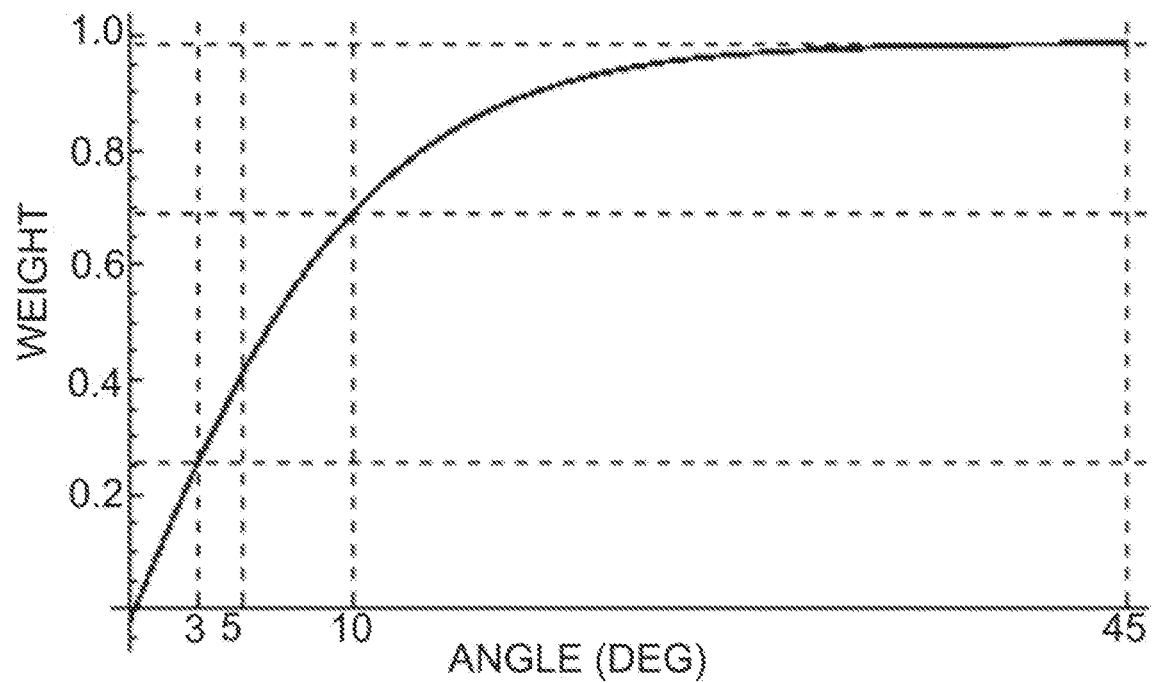
FIG. 5B depicts a parabolic function, in accordance with one or more embodiments of the present disclosure.

In embodiments, the non-linear scale may include a parabolic function. The parabolic function may be applied to the normalized vertical alignment. The parabolic function may include a characteristic U-shaped curve including one inflection points. The parabolic function may be considered a sideways parabola. For example, FIG. 5B depicts a parabolic function 504, although this is not intended to be limiting. The parabolic function 504 includes a weight of less than 0.25 for the vertical alignment 342 with an angle of 3 degrees. The parabolic function 504 includes a weight of 0.4 for the vertical alignment 342 with an angle of 5 degrees. The parabolic function 504 includes a weight of 0.7 for the vertical alignment 342 with an angle of 10 degrees. The parabolic function 504 includes a weight of near 1.0 for the vertical alignment 342 with an angle of 45 degrees.

Although the non-linear scale is described as including the sigmoid function and/or the parabolic function, this is not intended as a limitation of the present disclosure. It is contemplated that the weight function 350 may include any number of non-linear scales. For example, the weight function 350 may include, but is not limited to, polynomials (e.g., linear, quadratic, cubic, etc.), rational (e.g., square root, etc.), and the like. However, the sigmoid function and the parabolic function have been experimentally determined to estimate the expected landing runway 354.

In embodiments, the weight function 350 may include a scalar. The weight function 350 may include a first scalar for the in-approach geometry 344 and a second scalar for the in-flight plan 346. The weighted in-approach geometry parameters may be determined by applying the first scalar to the normalized in-approach geometry parameters. Similarly, the weighted in-flight plan parameters may be determined by applying the second scalar to the normalized in-flight plan parameters. In embodiments, the weighted in-approach geometry parameters are weighted more heavily than the weighted in-flight plan parameters. For example, the first scalar may be larger than the second scalar. In this regard, aircrafts which are located within the approach zone 317 are considered to have a high confidence of being on path to the runway 312 associated with the given approach zone. The high confidence may be maintained even if the aircraft 100 is listed as having a different arrival runway 318 in the flight plan 306. The first scalar may include a value of 0.2 and the second scalar may include a value of 0.1, although this is not intended to be limiting. The aircraft being outside the runway geometry zone may add an increase of 0.2 to the runway alignment score 352. The mismatch between the runway and the arrival runway 318 adds an increase of 0.1 to the runway alignment score.

In embodiments, the weighted track alignments and/or weighted vector alignments which correspond to a track alignment of ten degrees are weighted between the weighted in-approach geometry parameters and the weighted in-flight plan parameters. For example, the sigmoid function 502 has a value (e.g., 0.15) between the first scalar (e.g., 0.2) and the second scalar (e.g., 0.1) at the track alignment of ten degrees. In this regard, track 328 and vector 330 deviations of ten degrees from the bearing 314 may be weighted more heavily than whether the runway 312 is in the flight plan 306 but less heavily than whether the aircraft 100 is in the approach zone 317 when selecting the expected landing runway 354.

In embodiments, the weighted vertical alignments which correspond to a vertical alignment of three degrees are weighted higher than the weighted in-approach geometry parameters and the weighted in-flight plan parameters. For example, the parabolic function 504 has a value (e.g., 0.25) greater than the first scalar (e.g., 0.2) and the second scalar (e.g., 0.1) at the vertical alignment of three degrees. In this regard, the deviations of the actual glideslope 332 from the expected glideslope 308 of more than three degrees may be weighted more than heavily than whether the runway 312 is in the flight plan 306 and more heavily than whether the aircraft 100 is in the approach zone 317 when selecting the expected landing runway 354.

The deviation ranges, normalization, and weighting of the parameters 336 may be further understood with reference to Table 1.

TABLE 1

| | Track Alignment 338 | Vector Alignment 340 | Vertical Alignment 342 | In-Approach Geometry 344 | In-Flight Plan 346 |
|---|---|---|---|---|---|
| Deviation Range | 0° to 180° | 0° to 180° | 0° to 90° | True/False | True/False |
| Normalized | [0-1] | [0-1] | [0-1] | [0, 1] | [0, 1] |
| Weighted | Sigmoid Function 502 | Sigmoid Function 502 | Parabolic Function 504 | [0, 0.2] | [0, 0.1] |

In embodiments, the weighting algorithm 334 may compute runway alignment scores 352 for each of the runways 312. The runway alignment score 352 may indicate how well the aircraft 100 is aligned to each of the runways 312 in horizontal and vertical dimensions. The runway alignment scores 352 may be computed based on the parameters 336. The runway alignment scores 352 may be determined by summing the weighted parameters from the weight function 350. For example, weighted track alignment, weighted vector alignment, weighted vertical alignment, weighted in-approach geometry, and weighted in-flight plan may be summed for each of the runways 312. The expected landing runway 354 may be selected based on the runway alignment scores 352. In embodiments, the expected landing runway 354 may be selected from a minimized runway alignment score or a maximized runway alignment score of the runway alignment scores 352.

In embodiments, the expected landing runway 354 may be different than the arrival runway 318 listed in the flight plan 306. In this regard, the runway overrun alerting and awareness system 212 may determine the runway overrun for the expected landing runway 354 to which the aircraft is aligned and likely to land on without requiring the pilot to update the flight plan 306.

In embodiments, the weighted track alignments 338 and/or the weighted vector alignments 340 which correspond to a track alignment and/or a vector alignment at an angle are weighted between the weighted in-approach geometry parameters 344 and the weighted in-flight plan parameters 346 by the sigmoid function 502 having a value between the scalar applied to the In-Approach Geometry 344 the scalar applied to the In-Flight Plan 346 at the vertical alignment at the angle.

In embodiments, the weighted vertical alignments 342 may include one or more weighted vertical alignments which correspond to a vertical alignment at an angle and which are weighted higher than the weighted in-approach geometry parameters 344 and the weighted in-flight plan parameters 346 by the parabolic function 504 having a value greater than the scalar applied to the In-Approach Geometry 344 the scalar applied to the In-Flight Plan 346 at the vertical alignment at the angle.

Figure 6:
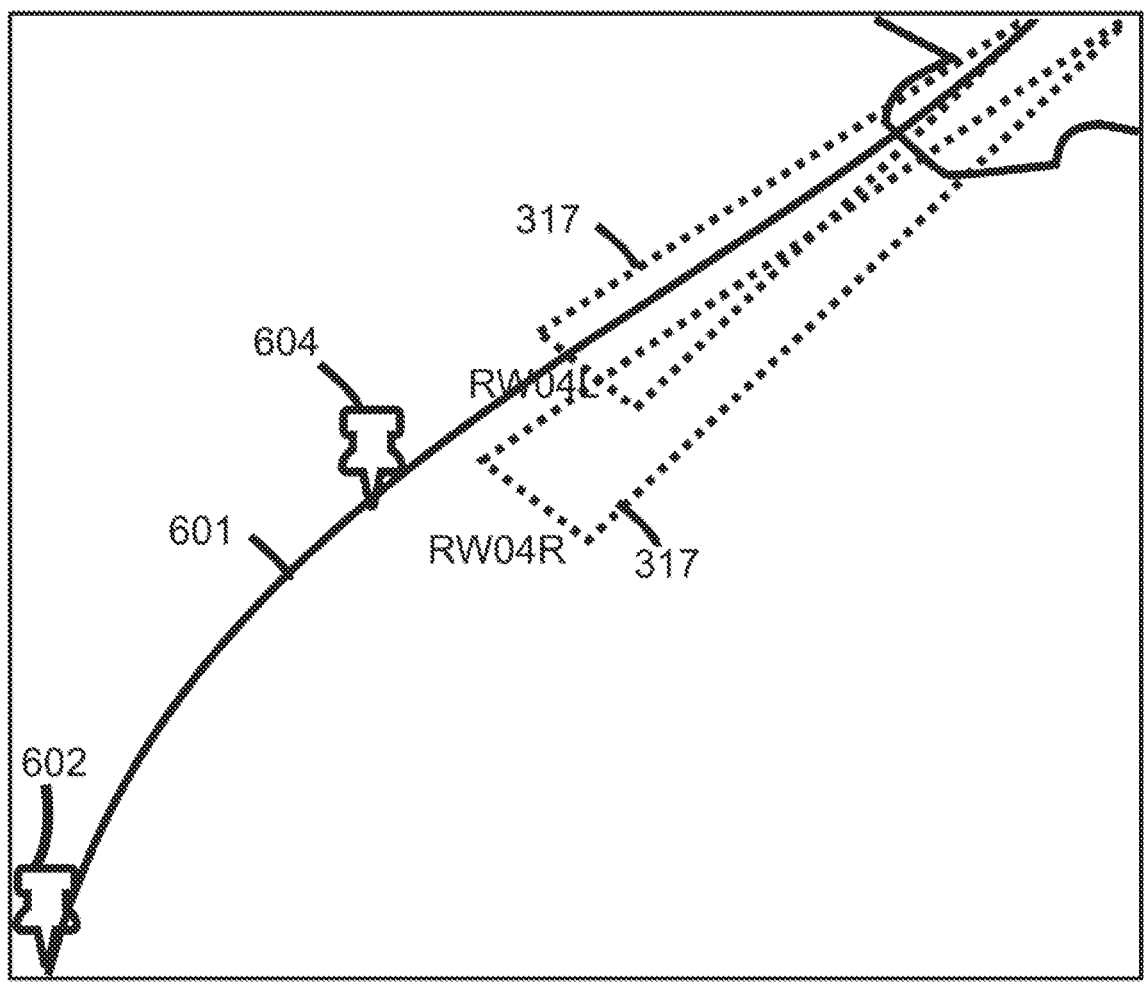
FIG. 6 depicts a top view of an aircraft approaching an airport, in accordance with one or more embodiments of the present disclosure.

Referring now to FIG. 6, an example landing is described, in accordance with one or more embodiments of the present disclosure. The example landing includes an arrival runway in the flight plan of runway 04R at Nice Côte d'Azur Airport (LFMN). The aircraft follows a track 601. At a pin 602 on the track 601, an expected landing runway for the aircraft is the runway 04R. At a pin 604 on the track 601, the processors 204 detect the runway 04L is the expected landing runway for the aircraft. In this example, the expected landing runway has changed from the arrival runway listed in the flight plan due to a combination of the track alignment 338, the vector alignment 340, the vertical alignment 342, the in-approach geometry 344, and the in-flight plan 346. The ROAAS may then compute the overrun probability for the runway 04L instead of the runway 04R.

Referring now to FIG. 7, a method 700 is described, in accordance with one or more embodiments of the present disclosure. The embodiments and the enabling technology described previously herein in the context of the aircraft 100 should be interpreted to extend to the method 700. For example, the method 700 may be implemented by the processors 204.

In a step 702, runway databases are retrieved from memory. The runway database may include information regarding one or more runways at each of the airports.

In a step 704, runway alignment scores for each of the runways are computed. The runway alignment scores are computed by normalizing, weighting, and summing a set of parameters. The set of parameters may include, but are not limited to, the track alignment 338, the vector alignment 340, the vertical alignment 342, the in-approach geometry 344, and the in-flight plan 346 parameters.

In a step 706, an expected landing runway is selected based on the runway alignment scores. The runway with the minimum or lowest runway alignment score may be selected as the expected landing runway.

In a step 708, an overrun probability is determined for the expected landing runway. The overrun probability is determined by a runway overrun alert and awareness system (ROAAS).

Figure 8:
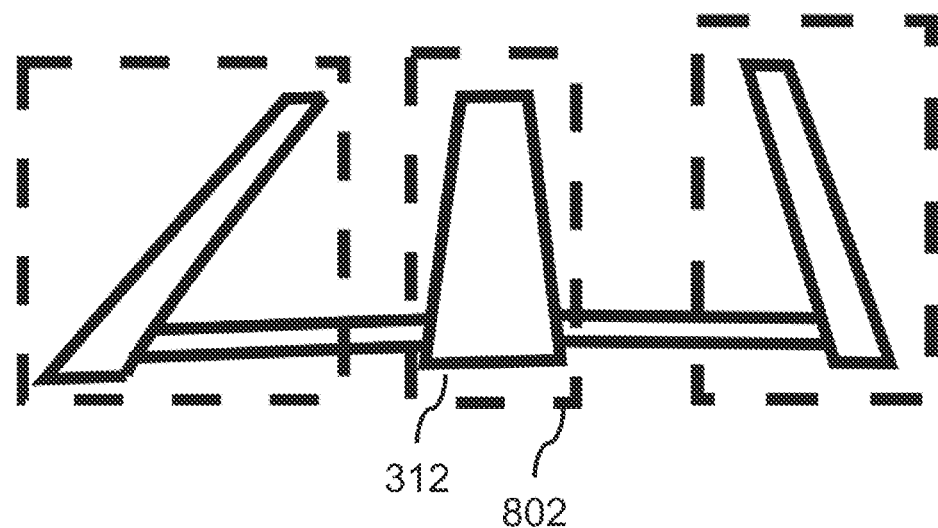
FIG. 8 depicts an image from an enhanced vision system, in accordance with one or more embodiments of the present disclosure.

Referring now to FIG. 8, an image 800 is described, in accordance with one or more embodiments of the present disclosure. The image 800 may be an image from an enhanced vision system (EVS) camera of the aircraft 100. The EVS camera may be any type of imaging sensors, such as, but not limited to, a color camera, an infrared camera (e.g., a forward looking infrared (FLIR) camera), and/or a radar. The EVS camera may be mounted to a surface of the aircraft. The EVS camera may capture images extending forward from the aircraft. The images may include one or more visual cues of the airport. For example, the EVS camera may capture a portion of the runway, taxiways, and the like. The EVS cameras may be located to capture a front-view from the aircraft 100. The image 800 may include a field-of-view of the airport. The image may include one or more runways, taxiways, and the like of the airport.

Although the parameters 336 are described as including the track alignment 338, the vector alignment 340, the vertical alignment 342, the in-approach geometry 344, and the in-flight plan 346 parameters, this is not intended to be limiting. It is further contemplated that the parameters may include an In-EVS image parameter. Images input from a front-facing onboard camera may be used as an additional factor in determining the expected landing runway 354.

In embodiments, the program instructions 310 may cause the processors 204 to detect the runways, taxiways, and the like in the image 800. The processors 204 to detect the runways, taxiways, and the like in the image 800 by performing image recognition on the images 800. The image recognition may include recognizing the position of the lights and/or the runways 312 in the image 800.

The processors 204 may generate bounding boxes 802. The bounding box 802 represents that the runways, taxiways, and the like, are in the image 800 at the location within the bounding box. Each of the bounding boxes 802 may bound a rectangular subset of pixels in the image 800. The bounding box 802 may represent the location of the runway, taxiway, and the like in the image 800 based the rectangular subset of pixels. The processors 204 may also detect which runway is in the image based on the bearing 314 printed on the runway 312. The parameters 336 of the weighting algorithm 334 may then include locations of the runways 312 detected by the bounding box 802. For example, the location of the runways 312 may indicate the aircraft is or is not aligned with the runway. In this regard, the processors 204 may select the expected landing runway from the runways based on the one or more runways detected in the image 800.

Referring generally again to FIGS. 1-8. In embodiments, the processors 204 may apply hysteresis before determining the overrun probability from the expected landing runway 354. The hysteresis may be applied to reduce processing requirements stemming from changes in the expected landing runway 354. For example, the expected landing runway 354 may change between multiple of the runways 312 within a time of a few seconds.

The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system comprising:
a memory maintaining program instructions; and
one or more processors configured to execute the program instructions causing the one or more processors to:
determine:
a plurality of track alignments, a plurality of vector alignments, and a plurality of vertical alignments, wherein the plurality of track alignments, the plurality of vector alignments, and the plurality of vertical alignments are determined between an aircraft and a plurality of runways, wherein the plurality of track alignments are an angular difference between a track of the aircraft and a runway bearing for each of the plurality of runways, wherein the plurality of vector alignments are an angular difference between a vector from the aircraft to the plurality of runways and the runway bearing for each of the plurality of runways, wherein the plurality of vertical alignments are an angular difference between an expected glideslope and an actual glideslope for each of the plurality of runways;
a plurality of in-approach geometry parameters, wherein the plurality of the in-approach geometry parameters indicate whether the aircraft is in an approach zone for each of the plurality of runways; and
a plurality of in-flight plan parameters, wherein the plurality of in-flight plan parameters indicate whether the plurality of runways are listed as an arrival runway of the aircraft in a flight plan; and
select an expected landing runway from the plurality of runways based on the plurality of track alignments, the plurality of vector alignments, the plurality of vertical alignments, the plurality of in-approach geometry parameters, and the plurality of in-flight plan parameters; wherein selecting the expected landing runway from one of the plurality of runways comprises:
determining a plurality of normalized parameters by normalizing each of the plurality of track alignments, the plurality of vector alignments, the plurality of vertical alignments, the plurality of in-approach geometry parameters, and the plurality of in-flight plan parameters;
determining a plurality of weighted parameters by weighting each of the plurality of normalized parameters;
determining runway alignment scores for each of the plurality of runways by summing the plurality of weighted parameters for each of the plurality of runways; and
selecting the expected landing runway based on the runway alignment scores;
wherein the plurality of normalized parameters comprises a plurality of normalized track alignments, a plurality of normalized vector alignments, a plurality of normalized vertical alignments, a plurality of normalized in-approach geometry parameters, and a plurality of normalized in-flight plan parameters; wherein the plurality of weighted parameters comprises a plurality of weighted track alignments, a plurality of weighted vector alignments, a plurality of weighted vertical alignments, a plurality of weighted in-approach geometry parameters, and a plurality of weighted in-flight plan parameters;
wherein the one or more processors determines the plurality of weighted in-approach geometry parameters by applying a first scalar to the plurality of normalized in-approach geometry parameters and determines the plurality of weighted in-flight plan parameters by applying a second scalar to the plurality of normalized in-flight plan parameters;
wherein the plurality of weighted in-approach geometry parameters are weighted more heavily than the plurality of weighted in-flight plan parameters by the first scalar being larger than the second scalar;
wherein the one or more processors determines the plurality of weighted track alignments by applying a sigmoid function to the plurality of normalized track alignments;
wherein the plurality of weighted track alignments which correspond to a track alignment at a first angle are weighted between the plurality of weighted in-approach geometry parameters and the plurality of weighted in-flight plan parameters by the sigmoid function having a value between the first scalar and the second scalar at the track alignment at the first angle.

2. The system of claim 1, wherein the expected landing runway is selected from one of a minimized runway alignment score or a maximized runway alignment score of the runway alignment scores.

3. The system of claim 1, wherein the one or more processors determines the plurality of weighted vector alignments by applying an additional sigmoid function to the plurality of normalized vector alignments.

4. The system of claim 3, wherein the plurality of weighted vector alignments which correspond to a vector alignment at a first angle are weighted between the plurality of weighted in-approach geometry parameters and the plurality of weighted in-flight plan parameters by the additional sigmoid function having a value between the first scalar and the second scalar at the vector alignment at the first angle.

5. The system of claim 1, wherein the one or more processors determine the plurality of weighted vertical alignments by applying a parabolic function to the plurality of normalized vertical alignments.

6. The system of claim 5, wherein the plurality of weighted vertical alignments includes one or more weighted vertical alignments which correspond to a vertical alignment at a first angle and which are weighted higher than the plurality of weighted in-approach geometry parameters and the plurality of weighted in-flight plan parameters by the parabolic function having a value greater than the first scalar and the second scalar at the vertical alignment at the first angle.

7. The system of claim 1, wherein the weighting for each of the plurality of normalized parameters are determined from a supervised regression model.

8. The system of claim 1, wherein the program instructions cause the one or more processors to determine an overrun probability for the expected landing runway in response to the one or more processors selecting the expected landing runway from the plurality of runways.

9. The system of claim 8, comprising a flight display, wherein the program instructions cause the one or more processors to display the overrun probability on the flight display in response to determining the overrun probability.

10. The system of claim 1, wherein the expected landing runway for the aircraft is different than the arrival runway of the aircraft listed in the flight plan.

11. The system of claim 1, wherein the expected glideslope is three-degrees.

12. The system of claim 1, wherein the approach zone is a trapezoid extending from a runway threshold of each of the plurality of runways, wherein the program instructions cause the one or more processors to determine whether the aircraft is in the approach zone using a point-in-polygon algorithm.

13. The system of claim 1, comprising an enhanced vision system camera configured to capture one or more images including one or more runways;
   wherein the program instruction cause the one or more processors to:
   detect the one or more runways in one or more images by performing image recognition on the one or more images; and
   select the expected landing runway from the plurality of runways based on the one or more runways detected in the one or more images.

14. A system comprising:
   a memory maintaining program instructions; and
   one or more processors configured to execute the program instructions causing the one or more processors to:
      determine:
         a plurality of track alignments, a plurality of vector alignments, and a plurality of vertical alignments, wherein the plurality of track alignments, the plurality of vector alignments, and the plurality of vertical alignments are determined between an aircraft and a plurality of runways, wherein the plurality of track alignments are an angular difference between a track of the aircraft and a runway bearing for each of the plurality of runways, wherein the plurality of vector alignments are an angular difference between a vector from the aircraft to the plurality of runways and the runway bearing for each of the plurality of runways, wherein the plurality of vertical alignments are an angular difference between an expected glideslope and an actual glideslope for each of the plurality of runways;
         a plurality of in-approach geometry parameters, wherein the plurality of the in-approach geometry parameters indicate whether the aircraft is in an approach zone for each of the plurality of runways; and
         a plurality of in-flight plan parameters, wherein the plurality of in-flight plan parameters indicate whether the plurality of runways are listed as an arrival runway of the aircraft in a flight plan; and
      select an expected landing runway from the plurality of runways based on the plurality of track alignments, the plurality of vector alignments, the plurality of vertical alignments, the plurality of in-approach geometry parameters, and the plurality of in-flight plan parameters; wherein selecting the expected landing runway from one of the plurality of runways comprises:
         determining a plurality of normalized parameters by normalizing each of the plurality of track alignments, the plurality of vector alignments, the plurality of vertical alignments, the plurality of in-approach geometry parameters, and the plurality of in-flight plan parameters;
         determining a plurality of weighted parameters by weighting each of the plurality of normalized parameters;
         determining runway alignment scores for each of the plurality of runways by summing the plurality of weighted parameters for each of the plurality of runways; and
         selecting the expected landing runway based on the runway alignment scores;
      wherein the plurality of normalized parameters comprises a plurality of normalized track alignments, a plurality of normalized vector alignments, a plurality of normalized vertical alignments, a plurality of normalized in-approach geometry parameters, and a plurality of normalized in-flight plan parameters; wherein the plurality of weighted parameters comprises a plurality of weighted track alignments, a plurality of weighted vector alignments, a plurality of weighted vertical alignments, a plurality of weighted in-approach geometry parameters, and a plurality of weighted in-flight plan parameters;
      wherein the one or more processors determines the plurality of weighted in-approach geometry parameters by applying a first scalar to the plurality of normalized in-approach geometry parameters and determines the plurality of weighted in-flight plan parameters by applying a second scalar to the plurality of normalized in-flight plan parameters;
      wherein the plurality of weighted in-approach geometry parameters are weighted more heavily than the plurality of weighted in-flight plan parameters by the first scalar being larger than the second scalar;
      wherein the one or more processors determines the plurality of weighted vector alignments by applying a sigmoid function to the plurality of normalized vector alignments;
      wherein the plurality of weighted vector alignments which correspond to a vector alignment at a first angle are weighted between the plurality of weighted in-approach geometry parameters and the plurality of weighted in-flight plan parameters by the sigmoid function having a value between the first scalar and the second scalar at the vector alignment at the first angle.

15. A system comprising:
   a memory maintaining program instructions; and
   one or more processors configured to execute the program instructions causing the one or more processors to:
      determine:
         a plurality of track alignments, a plurality of vector alignments, and a plurality of vertical alignments, wherein the plurality of track alignments, the plurality of vector alignments, and the plurality of vertical alignments are determined between an aircraft and a plurality of runways, wherein the plurality of track alignments are an angular difference between a track of the aircraft and a runway bearing for each of the plurality of runways, wherein the plurality of vector alignments are an angular difference between a vector from the aircraft to the plurality of runways and the runway bearing for each of the plurality of runways, wherein the plurality of vertical alignments are an angular difference between an expected glideslope and an actual glideslope for each of the plurality of runways;

a plurality of in-approach geometry parameters, wherein the plurality of the in-approach geometry parameters indicate whether the aircraft is in an approach zone for each of the plurality of runways; and a plurality of in-flight plan parameters, wherein the plurality of in-flight plan parameters indicate whether the plurality of runways are listed as an arrival runway of the aircraft in a flight plan; and select an expected landing runway from the plurality of runways based on the plurality of track alignments, the plurality of vector alignments, the plurality of vertical alignments, the plurality of in-approach geometry parameters, and the plurality of in-flight plan parameters; wherein selecting the expected landing runway from one of the plurality of runways comprises:

determining a plurality of normalized parameters by normalizing each of the plurality of track alignments, the plurality of vector alignments, the plurality of vertical alignments, the plurality of in-approach geometry parameters, and the plurality of in-flight plan parameters;

determining a plurality of weighted parameters by weighting each of the plurality of normalized parameters;

determining runway alignment scores for each of the plurality of runways by summing the plurality of weighted parameters for each of the plurality of runways; and selecting the expected landing runway based on the runway alignment scores;

wherein the plurality of normalized parameters comprises a plurality of normalized track alignments, a plurality of normalized vector alignments, a plurality of normalized vertical alignments, a plurality of normalized in-approach geometry parameters, and a plurality of normalized in-flight plan parameters; wherein the plurality of weighted parameters comprises a plurality of weighted track alignments, a plurality of weighted vector alignments, a plurality of weighted vertical alignments, a plurality of weighted in-approach geometry parameters, and a plurality of weighted in-flight plan parameters;

wherein the one or more processors determines the plurality of weighted in-approach geometry parameters by applying a first scalar to the plurality of normalized in-approach geometry parameters and determines the plurality of weighted in-flight plan parameters by applying a second scalar to the plurality of normalized in-flight plan parameters;

wherein the plurality of weighted in-approach geometry parameters are weighted more heavily than the plurality of weighted in-flight plan parameters by the first scalar being larger than the second scalar;

wherein the one or more processors determine the plurality of weighted vertical alignments by applying a parabolic function to the plurality of normalized vertical alignments;

wherein the plurality of weighted vertical alignments includes one or more weighted vertical alignments which correspond to a vertical alignment at a first angle and which are weighted higher than the plurality of weighted in-approach geometry parameters and the plurality of weighted in-flight plan parameters by the parabolic function having a value greater than the first scalar and the second scalar at the vertical alignment at the first angle.

\* \* \* \* \*